Dec. 14, 1937.    P. VAN WYK    2,102,340
REMOVING SPRAY RESIDUE AND OTHER ACCUMULATIONS FROM FRUIT AND THE LIKE
Filed March 27, 1934    3 Sheets-Sheet 1

INVENTOR.
Paul Van Wyk
BY
ATTORNEYS.

Dec. 14, 1937.  P. VAN WYK  2,102,340
REMOVING SPRAY RESIDUE AND OTHER ACCUMULATIONS FROM FRUIT AND THE LIKE
Filed March 27, 1934  3 Sheets-Sheet 2

INVENTOR.
Paul Van Wyk
BY
Graham
ATTORNEYS.

Dec. 14, 1937.                P. VAN WYK                2,102,340
REMOVING SPRAY RESIDUE AND OTHER ACCUMULATIONS FROM FRUIT AND THE LIKE
                  Filed March 27, 1934        3 Sheets-Sheet 3
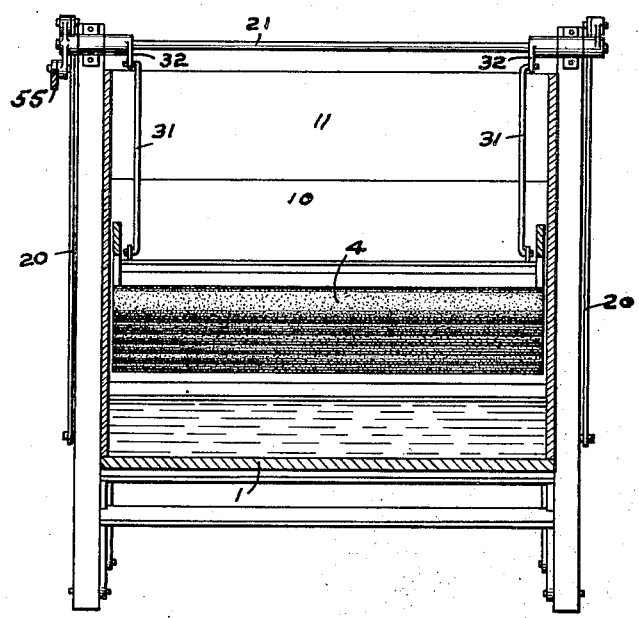
Fig. 3.
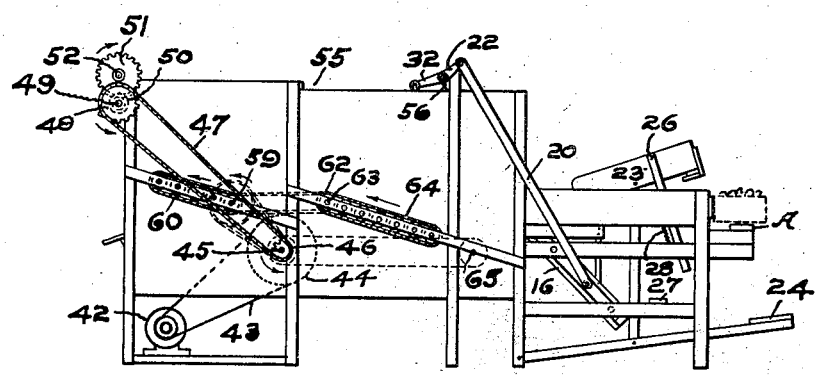
Fig. 5.    Fig. 4
INVENTOR.
Paul Van Wyk
BY
ATTORNEYS.

Patented Dec. 14, 1937

2,102,340

UNITED STATES PATENT OFFICE 2,102,340

REMOVING SPRAY RESIDUE AND OTHER ACCUMULATIONS FROM FRUIT AND THE LIKE

Paul Van Wyk, Portland, Oreg., assignor to Food Machinery Corporation, San Jose, Calif., a corporation of Delaware Application March 27, 1934, Serial No. 717,644

19 Claims. (Cl. 146—202)

This invention relates to an apparatus for treating the outer surfaces of fruits and the like and is particularly adapted to the treatment of apples to remove spray residue, or to the treatment of other fruits for removing any surface accumulations in the preparations of the fruits for packing and marketing.

In the districts where apples are grown on a large scale spraying is necessary to control insect and fungus pests so as to produce fruit that is sound and clear for shipment and consumption by the public.

The various sprays used must be of a somewhat tenacious nature so they will adhere to the fruit and trees and thus protect them from the ravages of the pests, this spray material along with the natural accumulations of dust and dirt of various kinds that become attached to the fruit during the growing season must be removed by some effective means that will remove it down to the minimum requirements of the Government and still not injure the skin surfaces of the fruit in any manner.

It has been determined by extensive experiments covering some years, that one of the most efficient ways of removing the adhering spray residue and other accumulations is by means of a flood volume of a suitable spray solvent and washing liquid applied while the fruit is subjected to a brushing and scrubbing action by suitable mechanism.

In order to treat each fruit in a continuous manner and still have large capacity in the operation of a treating apparatus it is necessary to feed and handle the fruit so that each piece will receive substantially the same treatment as to time and effectiveness and still permit of a continuous stream of a large volume of fruit to pass through the machine.

A large volume and continuous flow of solution over and through the interstices between the pieces of fruit is desirable so that the solvent action can be rapid and a fresh solution applied continuously to each piece of fruit as it passes through the machine.

The solutions for removing the spray residue are usually of an acid nature, since it has been found that such solutions will act to dissolve, loosen and carry away the accumulations from the surfaces of the fruit in a more rapid and effective manner than other solutions.

There are instances, however, where certain kinds of spray materials are used, that other kinds of solutions are also effective to remove or loosen the surface accumulations from the fruit, and it has also been found that these solutions may be used alternately and in succession to attain certain desirable results.

Another important requirement in machines of this character is that they be as simple in construction as possible and as cheaply produced so the small orchardist and packer can afford to supply himself with the most modern and effective equipment and thus compete with the larger growers.

The apparatus disclosed in this application is very simple in construction and well within the means of the small operator and comprises briefly, a tank for holding a supply of treating and washing solutions; a feed device for delivering fruit in measured quantities to the machine; a device for supplying a flood stream of each of the various liquids used; a brushing and scrubbing device that operates coincident with the flow of the solution over the fruit; control means for controlling the advance of the fruit over the brushing and scrubbing means; and a unitary structure for containing and supporting all of the operative mechanism which is preferably operated from a single source of power.

In the machine disclosed in the drawings there is provided a primary feed device onto which the fruit is dumped promiscuously and which arranges the fruit in spaced rows and delivers single rows to the brushing and scrubbing devices.

The brushing and scrubbing devices comprise a series of rows of brushes or rolls having bristles, resilient fingers, toweling, felt, plush or any other material that will rub and scrub the surfaces of the fruit while in contact therewith. These rolls are placed on a slight incline with the axes across the incline and spaced so as to form valleys therebetween to form supporting means for the rows of fruit delivered to them from the primary feed device, and to roll and scrub the fruit while in the valleys. After the fruit leaves the scrubbing rolls it passes onto a rinsing section comprising rolls of the same character, or with coverings of a different character according to the treatment to be given. In order to advance the rows of fruit from valley to valley through the machine there is provided a series of flexible fingers or flaps that move in a somewhat elliptic path over the tops of the rolls but out of contact therewith, that is normally out of contact therewith, which lightly touch the rows of fruit which increases the tractive force between the rolls and fruit and causes each group to move into the next adjacent valley and the row in the last valley to pass from that valley into contact with the other set of rolls where the fruit is washed and rinsed. While the drawings show only one treating and one rinsing section it is to be understood that these sections may be multiplied to as many individual sections as is desired for the treatment necessary.

Between the primary feed device and the brushing or treating section is a grid runway over which each row of fruit passes as it leaves the feed device. Directly under the grid runway is positioned a paddle wheel partly immersed in the solution in the tank and rotated so that it will pick up a large volume of solution and throw it upward through the grid runway and out over the brushing section where it falls like rain onto the fruit and fully immerses it as it runs over and through the interstices thereof, thus full wetting both the fruit and the brushing rolls while the fruit is turned over and over and through many changing axes to present all surfaces continually to the action of the brush rolls and the flood stream of solution.

When the fruit passes from the treating section into the rinsing section it passes over another grid runway through which rinse water or any other desired solution is thrown by a paddle wheel in like manner to that of the treating section.

It is believed that an examination of the drawings will indicate to anyone skilled in the art that to add additional sections for a plurality of treatments would be a simple matter and would only require a lengthening of the tank to accommodate the extra sections, and the tank could be divided so that each section might operate with a different solution.

The treating sections and the washing sections could be, if desired, complete units simply set end to end and bolted together to form a single unit, with a paddle wheel and a feed control over the brush rolls for each section, with a grid runway between each section to lead the fruit from one to the other. It is also to be noted that a rinsing section might be placed between each treating section if desired to give a plurality of different treatments to the fruit as it passed through the apparatus, and rinse the treating solution from the fruit each time before passing it to the next treating section. Such multiplication of the units of the apparatus shown being well within the disclosure in this application.

It is therefore a principal object of the invention to provide a machine or apparatus for treating fruit and the like which is adapted to be built up of multiple units to provide a machine for a multiplicity of treatments to a stream of moving fruit or product.

It is a further principal object of the invention to provide an apparatus for treating fruit and the like for the removal of spray residue and other accumulation from the skins of fruits by means of the combined action of a large volume of treating solution and at the same time rubbing and scrubbing the fruit to loosen and wash away the deposits.

It is a further principal object of the invention to provide a machine for treating fruit or the like to remove spray residue and other accumulations from the surfaces thereof wherein a flood stream of treating solution is thrown up over the fruit in a manner to cause it to fall thereon like rain and to fully immerse and cover the fruit while passing thereover and through the interstices therebetween.

It is a further principal object of the invention to provide a machine for treating fruit and the like to remove spray residue and other accumulations from the surfaces thereof wherein fruit may be dumped promiscuously onto a feed device that will segregate the fruit and arrange it in rows and discharge single rows intermittently to the treating devices.

It is a further principal object of the invention to provide a machine for treating fruit and the like to remove spray residue and other accumulations from the surfaces thereof wherein the rows of fruit delivered by the primary feeding device are passed through an upward flow of treating solution to fully wet the surfaces thereof while passing on to the treating section.

It is a further principal object of the invention to provide a machine for treating fruit and the like to remove spray residue and other accumulation from the surfaces thereof wherein a series of rows of fruit are simultaneously advanced in step by step relation and from valley to valley of the brushing and scrubbing mechanism.

It is a further object of the invention to provide a machine for treating fruit and the like to remove spray residue and other accumulation from the surfaces thereof wherein each treating unit is substantially independent of all other units thus permitting the multiplication of units to make any size and capacity machine desired.

It is a further object of the invention to provide a machine for removing spray residue and other accumulations from fruit and the like wherein a paddle wheel located under the line of moving fruit is arranged to throw a continuous stream of treating solution up through the path of the fruit in a manner to cause it to fall on the fruit like rain and to pass over and through the interstices thereof and back into the tank, the paddle wheel being the only means of circulation.

It is also an object of the invention to provide a machine for removing spray residue and other accumulations from the surfaces of fruit and the like wherein a tank of solution is provided and a paddle wheel therein to throw solution up and over a body of fruit under treatment and having means cooperating with the paddle wheel to prevent a surging of the liquid toward the paddle wheel to interfere with its most efficient operation.

It is a further object of the invention to provide a machine for removing spray residue and other accumulations from the surfaces of fruits wherein a chamber is provided for a paddle wheel with an opening near the bottom for the admission of liquid thereto so as to maintain a substantially constant level of liquid in the chamber while the paddle is operating.

It is a further object of the invention to provide a machine for removing spray residue and other accumulations from the surfaces of fruit and the like wherein means are provided for throwing a stream of liquid over a body of fruit under treatment and other means are provided to control the extent of throw of said liquid so as to confine it to substantially the area occupied by the body of fruit.

With such objects in view as well as other advantages inherent in the invention, the novel structural peculiarities, novel organization of elements, and the separate and collective operations involved in carrying out the recited objects of the invention, which will be made the subject matter of claims hereto appended, I wish it understood that the several necessary elements and combinations constituting the same may be varied in their proportions, placement, general arrangement and operative relation without departing from the scope and nature of the invention.

In carrying out the objects of the invention in a concrete form or machine, further objects, advantages and improvements have been evolved than have been recited, and in order to make the invention more clearly understood there are shown in the accompanying drawings, means and mechanism embodying the preferred structural arrangement and disposition of the different parts and combinations, in which I have simply illustrated one way of embodying the creative part or concept of the invention in an operative machine or apparatus, and in doing so I do not wish to limit the claims to the exact details shown, the described devices being only embodiments of the invention that other structures might employ, and some of the parts and combinations of parts might be used without others in different types of machines without departure from the purview of the invention so that I regard myself as entitled to all such variations from the shown and described devices as fall within the scope and meaning of the claims.

Reference now being had to the drawings accompanying this application a better and clearer understanding of the invention will be had. The drawings, however, are not necessarily made to scale, neither are the various parts in exact proportions relative to other parts and some parts may be exaggerated in size or location to better illustrate and show the operation of a machine embodying the invention.

Figure 3 is a vertical cross section of the apparatus taken on substantially the line 3—3 of Figure 1.

Figure 4 is a side view of the entire apparatus.

Figure 5 is a partial view of one of the brush rolls showing them provided with a spiral groove which is usually a desirable construction.

Figure 1:
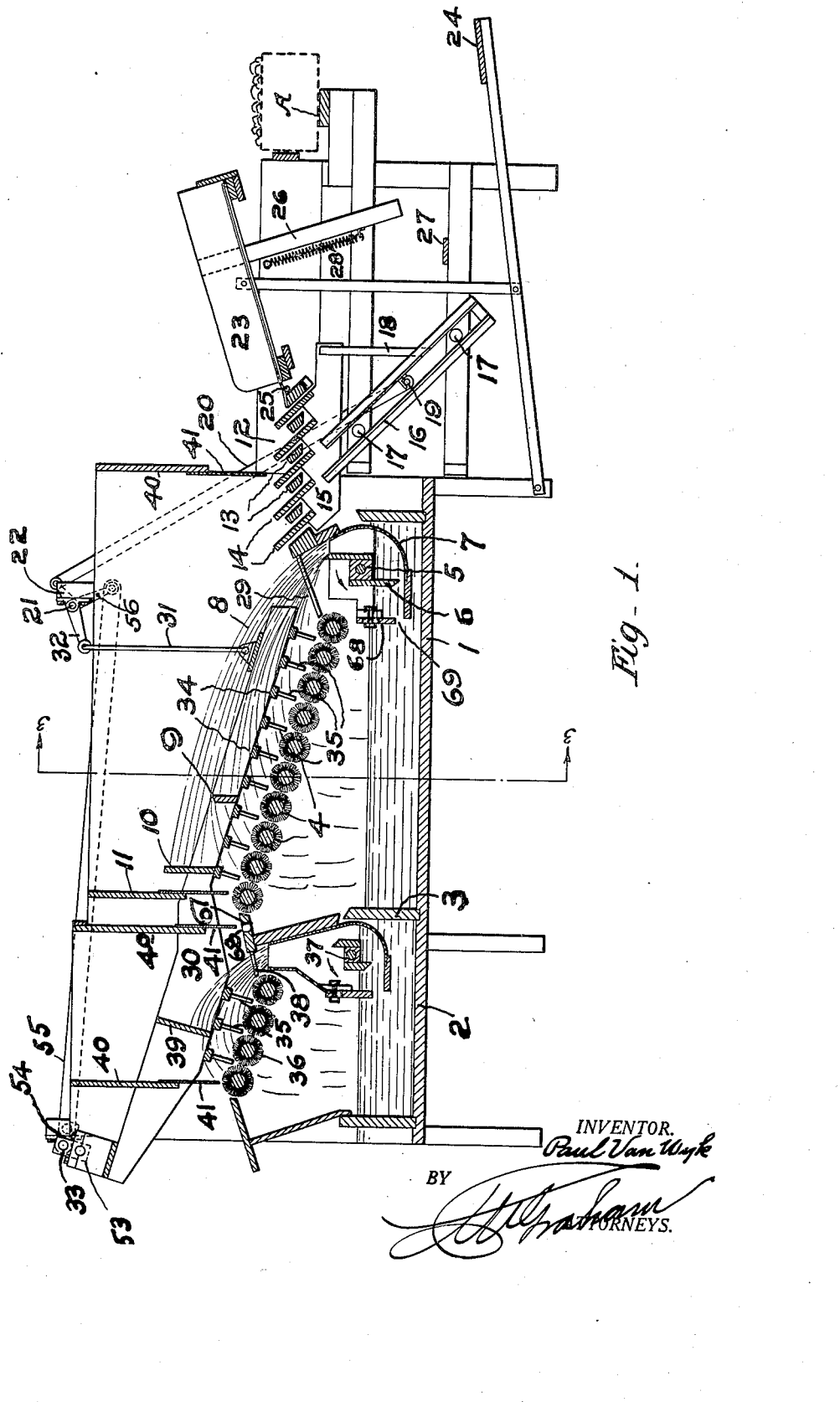
Figure 1 is a vertical sectional elevation taken on substantially the line 1—1 of Figure 2.
Figure 2:
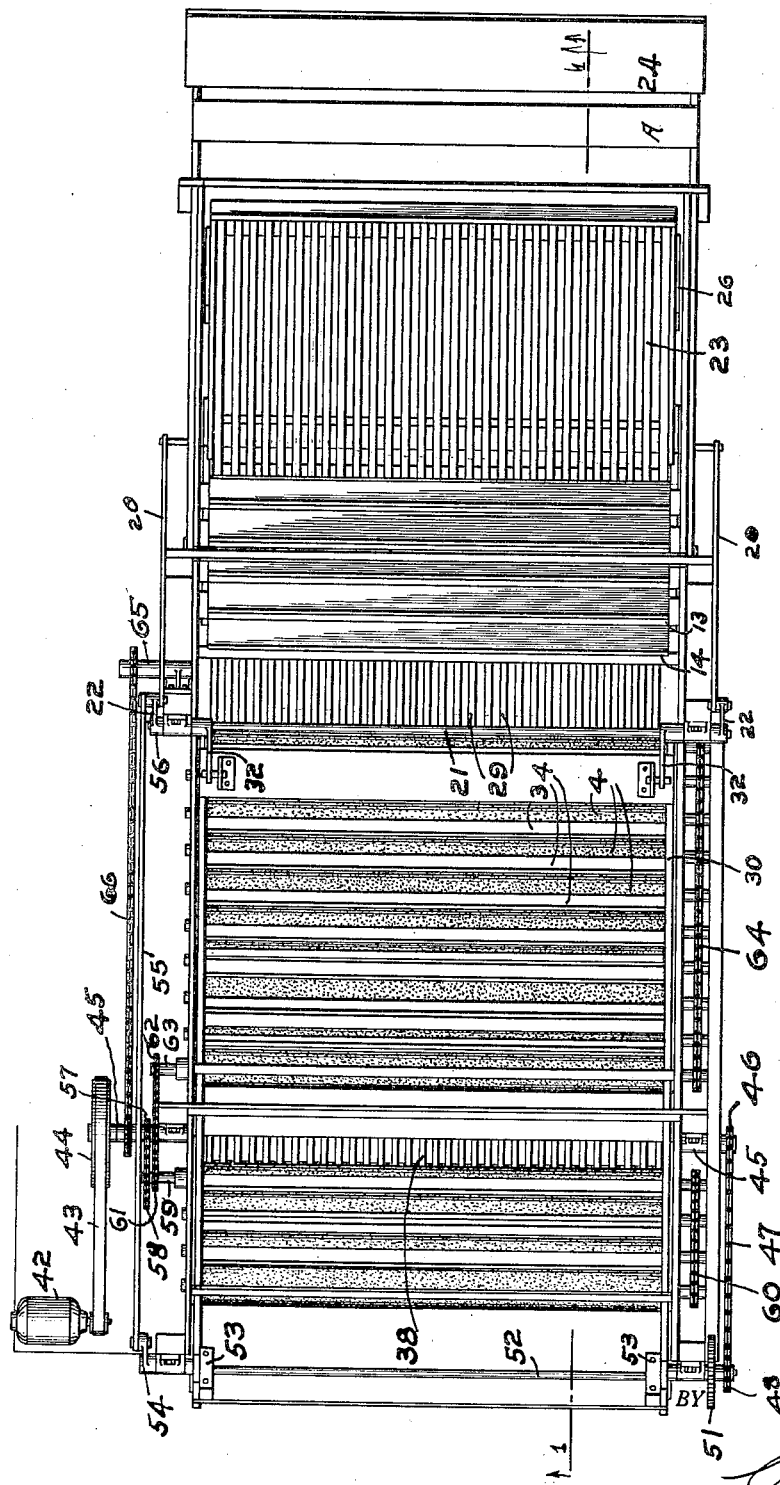
Figure 2 is a plan of the apparatus.

The numeral 1 indicates a tank for a treating solution, and 2 represents a divided section of the tank for a rinsing solution with a partition wall 3 dividing the solutions. Arranged over the tank of treating solution are a series of brush rolls 4 arranged axially parallel and placed to form an inclined supporting surface for the fruit to be treated. The rolls 4 are spaced to form valleys between adjacent rolls in which rows of fruit are accumulated and rolled over and over during the treating thereof. The rolls may be of soft or hard bristles, may have elastic fingers of a resilient material, may be of plush, toweling, felt or any other suitable material, changing at times to suit the particular kinds of fruits being treated or the results desired through the treatment.

Located in the tank at the fruit entrance is positioned a paddle wheel 5, shown with two blades 6, more blades may be used if desired. A housing 7 is placed around the paddle wheel 5 to confine the liquid picked up by the blades 6 and direct it in a stream out over the top of the brush rolls 4 where it sprays somewhat and falls onto the fruit on the rolls like a rain, thoroughly wetting the fruit and immersing it while flowing thereover and through the interstices therebetween and then passing back into the solution in the tank below for reuse. The broken lines 8 indicate the path of the liquid as thrown by the paddle wheel.

Baffles 9 and 10 serve to confine the liquid to the area occupied by the fruit and prevent the extreme throw from entering the rinsing section of the apparatus. An auxiliary baffle 11 serves to stop any liquid that might get past the baffle 10, and divert it back into the tank.

A primary feed device 12 delivers fruit in measured quantities to the brush rolls. The feed device comprises a series of transverse bars 13 secured across the machine, and another series of transverse bars 14 arranged in alternate relation with the bars 13 and secured to the movable frame work 15. Both sets of bars 13 and 14 are inclined forwardly, the reason for which will become apparent. The frame work 15 is supported by a slideway 16 supported on the rollers 17 and braced by the bar 18. The slideway 16 has connection at 19 with the pitman 20 extending to the rock shaft 21 and there connected to a crank arm 22.

A tilting hopper 23 is positioned in front of the primary feed 12 and is adapted to receive and direct the fruit onto the feeder when dumped thereon by the attendant. By depressing the pedal 24 the hopper 23 swings on the pivot 25 and lowers so that the leg 26 rests on the support 27, the operator standing on the pedal 24 and thereby placing the spring 28 under tension. A box of fruit is supported on the hopper when in the depressed position. When it is desired to dump the fruit the operator steps off the pedal, which permits the spring 28 to raise the hopper to the position in Figure 1, when the operator dumps the box of fruit onto the hopper and it rolls promiscuously down onto the top edges of the cross bars 13 and 14 and is thereby segregated into individual rows and the rows intermittently discharged onto the grid runway 29 which directs it to the valley between the first pair of rolls.

Directly over the treating rolls 4 is positioned a progressor mechanism that intermittently contacts with the rows of fruit deposited in the valleys and causes each row to advance to the next valley and the last row to leave the treating zone and pass to the rinsing section. This progressor mechanism comprises an oscillatory frame work 30, one end of which is hung on the link 31 which is in turn connected to the crank arm 32 which imparts an up and down movement to this end of the frame 30. The other end of the frame 30 is carried by a crank 33 which makes a complete revolution in its cycle of operation and thereby imparts to the frame 30 a movement that is somewhat elliptical. The movements of the crank 33 and the arm 32 are so timed that the frame 30 is lifted vertically while being moved horizontally which gives to it the elliptical path mentioned. Depending from the frame 30 are cross bars 34 carrying flexible fingers 35 spaced substantially the same as the spacing of the valleys in which the fruit is supported. As the frame 30 is oscillated the fingers 35 contact simultaneously with each row of fruit and give it the necessary urge to pass over the roll into the next valley.

Immediately back of the treating section is shown a rinsing section, the operation of which is the same as the treating section, it is however, smaller in extent since it takes less liquid for rinsing than for treating. The rolls with suitable covering, 36 support the fruit, a paddle wheel 37 throws rinsing liquid through a grid runway 38 over onto the fruit in the valleys between the rolls 36 and a baffle 39 prevents the rinse liquid from going beyond the confines of the rinsing section.

Partitions 40 define the extent of the treating and rinsing sections and the flexible flaps 41 serve to close the entrance and exits of the sections so that little or no solution will be thrown therethrough.

The apparatus is driven by means of a motor 42, belt 43, pulley 44 on shaft 45 which extends across the machine. On the opposite side of the machine the shaft 45 carries the sprocket 46, chain 47 leading to the sprocket 48 on the shaft 49, which in turn carries the pinion 50 meshing with the gear 51 on the shaft 52 which extends across the machine and on the opposite end carries the crank 53 and the crank 54. A pitman 55 extends from the crank 54 to the rocker arm 56.

A sprocket 57 on the shaft 45 connects by a chain with the sprocket 58 on the end of a rinsing roll shaft 59. The chain 60 overriding sprockets on the roll shafts transmit rotary motion to the shafts carrying the rinsing rolls 36. A sprocket 61 on the shaft 59 connects by chain with a sprocket 62 on one of the treating roll shafts 63 which transmits rotary motion to the shaft 63 and through the overriding chain 64 motion is transmitted to all of the treating rolls 4. The paddle wheel 37 is carried by shaft 45 and the paddle wheel 5 is carried on the shaft 65 which is driven through the chain 66 running from shaft 45.

The foregoing gives a detailed description of the operative elements and combinations and the various connections and drives comprising the complete apparatus.

From now on it is believed that an operative description will give a better understanding of the machine and its possibilities.

Operation

In order to set the apparatus of this application in operation the tank would be filled with treating solution and rinse liquid, each in their respective compartments. The motor being started the various operative elements would begin their cycle of movements. The operator standing on the pedal 24 would depress the hopper 23 into its lowermost position with the leg 26 resting on the pad 27. This brings the hopper into position for him to pick up the box of fruit from the table "A" and dump it into the hopper where it will remain until he steps off the pedal 24 when the spring 28 will lift the hopper to the position of Figure 1 when the fruit will roll down the inclined hopper onto the primary feeder 12 and begin to assume single row positions on account of the upward movement of the feeder bars 14 which tend to lift the pieces of fruit resting thereon and cause them to roll forward and rest on the fixed bars 13, then when the bars 14 are depressed so their tops are below the tops of the bars 13 each fruit will roll forward into the next space and when the bars 14 again raise the fruit are rolled forward again and this process is repeated until the fruit has accumulated in the forward spaces and assumed row arrangement which occurs just before the forward row is discharged from the bars by the upward movement of the bars 14. The bars 14 get their upward and downward movement at the inclination shown through the operation of the rocker arms 56, 22 and the link 20 connecting with the slide 16 moving over the bearing rollers 17. The rocker arms 22 and 56 getting their movement through the pitman 55 and the continuously rotating crank 53.

As each row of fruit is discharged from the primary feeder 12 it rolls along a grid runway 29 and enters the valley between the first two rolls. Here the row remains being turned over and over through varying axes to present all surfaces to the action of the rolls and thereby receive a good rubbing or scrubbing.

The progressor mechanism 30 is timed to operate with the same oscillations as the bars of the primary feed device 12, so that just as a row of fruit is released by the primary feed device the progressor fingers or flaps are just passing over the valleys and moving the rows of fruit along to the next succeeding valley, this manner of timing leaves the first valley open just as a row of fruit is released so that as it rolls down the grid runway it immediately lands in the first valley. This procedure continues until all of the valleys have been filled and the fruit therein treated when the rows of fruit will begin to be discharged from the end of the treating section and roll down over a drain board 67 in which there is a slot 68 through which treating solution will drain back into the solution tank for reuse. The row of fruit continues on over the drain board and over another grid runway from which it drops into the first valley of the rinsing rolls.

The passage of the rows of fruit across the valleys of the rinsing section is the same as described for the treating section.

On account of the inclined supporting surface provided by the series of treating rolls and the valleys in which the fruit is supported there is not enough tractive force between the surfaces of the rolls and the fruit to lift the fruit over the advanced roll into the next valley, this permits a certain time for the fruit to remain in each valley to receive treatment. The contact of the flexible fingers or flaps 35 against each row of fruit as these are advanced adds just enough urge to the fruit to cause it to roll over the next roll and as each row is affected in the same manner there is a simultaneous movement from valley to valley of all the rows, and when the machine is full of fruit there is a row discharged from the treating section into the rinsing section at each oscillation of the progressor member, and a row of fruit fed to the treating section by the primary feeder device. This provides a timed movement of the fruit through the machine and insures that each piece of fruit will receive the same treatment and time of passage through the machine.

The treating solution and the rinsing liquid are both projected over the tops of the fruit in a manner to cause it to fall onto the fruit somewhat like rain but in a flood volume so that the fruit is constantly immersed in a continuously flowing body of solution that percolates down through the interstices between the fruit and drops back into the tank for reuse.

The device for projecting the solutions up over the rows of fruit comprises the paddle wheels 5 and 37. Since both work in the same manner I will confine the description to the paddle wheel 5 which handles the solution for loosening and removing the spray residue and other accumulations.

The paddle wheel shown is provided with two blades but it is obvious that any number may be used. The wheel is positioned so that it rotates just at the top level of the solution. The wheel is enclosed in a housing 7 that confines a portion of solution and substantially cuts it off from the main body of solution. On one side of the housing 7 is a gate 68 mounted for vertical adjustment so that the port 69 can be reduced or enlarged to suit operating conditions. The port 69 permits solution to fill the housing 7 and prevents a surge of solution to flow to the wheel due to its churning action in a large body of solution. The port 69 can be adjusted to admit just enough solution to flow into the housing 7 to keep the level in the housing at the desired point, and due to the action of the blades in lifting the solution out of the housing the level in the housing may be slightly below the level in the main tank.

This manner of controlling the solution prevents all surging of liquid toward the paddle wheel on account of its churning and circulating action and guarantees that each portion of liquid lifted and thrown by each blade will be substantially the same throughout a day run, and thus the fruit passing over the rolls will continually receive the same amount of solution so that the treatment will not vary in extent or effectiveness.

As the stream of solution leaves the blades of the paddle wheel it is deflected by the curved side of the housing so that it is projected up and over the rows of fruit held in the valleys between rolls. Just as it leaves the housing it encounters a grid runway 29 over which the fruit rolls from the feeder to the first valley. This grid runway is composed of rods covered with rubber and spaced just so the smallest fruit will be unable to pass through, thus the rods offer little obstruction to the passage of the liquid thrown by the paddle wheel, and the rolling of the fruit thereover offers little obstruction because the rows are released only intermittently, so that for a large part of the time the rods are not covered and the solution therefor thrown by the paddle wheel passes therethrough in flood volume. The rods also serve to break up the body of solution and cause it to form more or less of a dense and heavy spray that falls like heavy rain, fully immersing the fruit as it falls thereon and passes through the interstices therebetween.

To prevent the solution thrown up by the paddle wheel 5 from passing beyond the area of the treating zone the baffles 9 and 10 secured to the frame member 30 are positioned to intercept the ends of the stream and prevent it from going beyond their confines so that practically none of the solution will get beyond the last valley. In case more or less splash should occur around the baffle 10 an auxiliary baffle 11 is provided that extends to the top of the treating compartment and most effectually cuts off any spray of solution that might pass the baffle 10 and drains it back into the solution tank.

Since the usual treating solution is of an acid nature it is desirable that as much as possible be drained from the fruit before it enters the rinsing section so that the rinse water will not be contaminated too rapidly and thus require replacement too often.

The drain board 67, while shown quite narrow in the drawings, may be extended to any width desired, acts to drain very much of the acid solution from the fruit and on account of the inclination of this drain board the liquid will run down through the slots 68 and back into the tank.

The rinse liquid is projected over the fruit in the same manner as described for the treating section and acts in the same manner on the fruit.

The rolls are shown as with unbroken surfaces but if desired they may be made with spiral grooves and the grooves running in alternate directions in alternate rolls which grooves will help to turn the fruit through constantly changing axes and thus present all sides of the fruit to the action of the treating agents. If the rolls are felt covered or plush covered the grooves can be made by wrapping a double thickness of material spirally around the roll and having the spirals spaced to provide the grooves. See Figure 5.

Applicant wishes it understood that his invention contemplates the use of brushing rolls of any and all types and manner of covering to produce the desired surface action on the fruit.

It is to be noted that the level of liquid in the solution tank and the rinse tank may be different and are so shown in Figure 1. One reason for this would be to carry as large a volume of rinse liquid as possible so that it could be used over and over for a longer time without replacement. Notwithstanding that the treating solution is well controlled as it is projected over the fruit and the fruit is well drained in passing into the rinsing section more or less of the acid solution is carried into the rinse liquid so that after a certain time of use it must be replaced or replenished with fresh undiluted liquid.

What I claim as new and desire to secure by Letters Patent is:

1. An apparatus for treating fruit and the like to remove spray residue and other accumulations from the surfaces thereof comprising rotating transverse brush means for supporting and advancing a stream of fruit along a predetermined path, grid openings along said path, rotating means underneath said grid openings and transverse thereof for throwing a stream of treating solution upward therethrough and over the same onto fruit positioned on said supporting means, a tank of solution in which said rotary means is mounted and means for imparting rotation thereto, a housing surrounding said rotating means to segregate the body of liquid directly in contact with said rotating means from the main body of liquid in the tank.

2. An apparatus for treating fruit and the like for removing spray residue and other accumulations comprising a series of rotating transverse treating rolls and a progresser member to advance fruit over said rolls through a predetermined path, rotary means below the path of fruit over said rolls and positioned parallel therewith to throw liquid upward through said path and over onto said fruit while on said rolls, a tank of solution in which said rotary means is mounted and means for imparting rotation thereto, a housing surrounding said rotating means to segregate the body of liquid directly in contact with said rotating means from the main body of liquid in the tank.

3. An apparatus for treating fruit and the like to remove spray residue and other accumulations from the surfaces thereof comprising a series of rotary transverse treating rolls arranged to form a supporting and progressing surface and to maintain the fruit in individual rows, a progressor member cooperating with said rolls to advance fruit thereover through a predetermined path, a rotary member located below said rolls and parallel therewith for throwing a stream of liquid upward through the path of advancing fruit and over onto said fruit whereby the liquid immerses the fruit and percolates down through the interstices thereof and assists in the removal of the said accumulations from the surfaces thereof, a tank of solution in which said rotary means is mounted and means for imparting rotation thereto, a housing surrounding said rotating means to segregate the body of liquid directly in contact with said rotating means from the main body of liquid in the tank.

4. An apparatus for treating fruit and the like to remove spray residue and other accumulations from the surfaces thereof comprising a series of transverse brush rolls forming an inclined supporting surface with fruit retaining valleys between adjacent rolls, means for feeding rows of fruit to said valleys in intermittent sequence, means for rotating said rolls to thereby turn said fruit while in said valleys, a progressor member for advancing the rows of fruit across said rolls through a predetermined path, a rotary member below the path of and parallel with the rows of moving fruit for throwing a stream of liquid upward through said path and over onto said fruit to cover and treat the same, a tank of solution in which said rotary means is mounted and means for imparting rotation thereto, a housing surrounding said rotating means to segregate the body of liquid directly in contact with said rotating means from the main body of liquid in the tank.

5. An apparatus for treating fruit and the like to remove spray residue and other accumulations of foreign matters from the surfaces thereof comprising a supporting bed of transverse spaced rolls for a single layer of fruit arranged in valleys and rows, means for progressing the fruit in rows from valley to valley through a predetermined path, means for feeding the fruit in rows to said valleys, rotary means underneath the path of travel of fruit and said supporting bed for projecting a stream of treating liquid upward through said path and over onto said fruit while in said valleys to cover and envelope the same while passing through the interstices therebetween and assist in removing the accumulations therefrom, a tank of solution in which said rotary means is mounted and means for imparting rotation thereto, a housing surrounding said rotating means to segregate the body of liquid directly in contact with said rotating means from the main body of liquid in the tank.

6. An apparatus for treating fruit and the like to remove spray residue and other accumulations from the surfaces thereof comprising a supporting bed for the fruit consisting of rotating transverse rolls arranged axially parallel to form supporting valleys therebetween, means for feeding rows of fruit to said valleys in intermittent sequence, means for progressing the fruit from valley to valley in the same timed intermittent sequence as the feeding thereof and through a predetermined path, rotary means below the path of travel of the fruit and arranged transversely parallel therewith to throw a stream of treating solution upward through said path and over onto the fruit on said supporting bed to cover and envelope the same while passing through the interstices thereof, a tank of solution in which said rotary means is mounted and means for imparting rotation thereto, a housing surrounding said rotating means to segregate the body of liquid directly in contact with said rotating means from the main body of liquid in the tank.

7. An apparatus for treating fruit and the like to remove spray residue and other accumulations from the surfaces thereof comprising a series of transverse brush or scrubbing rolls arranged on an inclined plane to form a fruit supporting bed, the fruit resting in the valleys between adjacent rolls, means for rotating the rolls in unison and all in the same direction, means for feeding rows of fruit to the valleys of said rolls in intermittent sequence, means located over said rolls for engaging fruit in said valleys and advancing the rows from valley to valley through a predetermined path, a rotary means below the path of moving fruit and transversely thereof for throwing a continuous stream of liquid up through said path and over onto the fruit supported by said rolls, a tank of solution in which said rotary means is mounted and means for imparting rotation thereto, a housing surrounding said rotating means to segregate the body of liquid directly in contact with said rotating means from the main body of liquid in the tank.

8. An apparatus for treating fruit to remove spray residue and other accumulations of foreign matter from the surfaces thereof comprising a series of transverse rolls forming a bed for supporting fruit in rows, a progressor located over said bed for advancing fruit thereover through a predetermined path, a rotary device located below the plane of said rolls and partially submerged in a liquid, blades for picking up said liquid and throwing it upward through the path of advancing fruit and over and onto the fruit on said bed to cover and submerge the same while trickling through the interstices therebetween with means for feeding fruit to said bed, a tank of solution in which said rotary means is mounted and means for imparting rotation thereto, a housing surrounding said rotating means to segregate the body of liquid directly in contact with said rotating means from the main body of liquid in the tank.

9. An apparatus for treating fruit and the like to remove spray residue and other accumulations from the surfaces thereof comprising a series of transverse rolls forming a supporting bed for spaced rows of fruit, means for advancing the fruit in rows across said bed, means for feeding the fruit in rows to said bed, a fixed grid runway forming a part of the path of said fruit, a rotary liquid projecting means located under said grid runway for projecting a stream of treating liquid up through sad grid runway and over onto the body of fruit on said supporting bed, the rows of fruit passing over said grid runway at the same time that liquid is passing therethrough, a tank of solution in which said rotary means is mounted and means for imparting rotation thereto, a housing surrounding said rotating means to segregate the body of liquid directly in contact with said rotating means from the main body of liquid in the tank.

10. An apparatus for treating fruit and the like for removing spray residue and other accumulations from the surfaces thereof comprising a series of transverse rolls forming a supporting bed for a body of fruit, means for advancing the fruit over the bed, means for feeding the fruit to the bed, a fixed grid runway over which the fruit passes in going to the bed, a rotary device under the grid runway for throwing a stream of liquid through the said grid and over onto the fruit on the bed, the direction of the stream of liquid being the same as the path of moving fruit, a tank of solution in which said rotary means is mounted and means for imparting rotation thereto, a housing surrounding said rotating means to segregate the body of liquid directly in contact with said rotating means from the main body of liquid in the tank.

11. An apparatus for treating fruit and the like comprising means for advancing fruit along a predetermined pathway, rotary means below said pathway consisting of a paddle wheel partly immersed in a body of liquid, means for rotating said paddle wheel, a fixed grid runway forming a part of said pathway, said paddle wheel being below said grid and transversely of said pathway, the rotation of said paddle wheel picking up liquid from a body of liquid and throwing it through said grid and up over and onto the fruit passing through said pathway to contact with said fruit and loosen and wash away accumulations from the surfaces thereof, a housing surrounding said paddle wheel to segregate the body of liquid directly in contact therewith, means for rotating said paddle wheel and deflecting means in the path of the projected liquid for directing it down onto the fruit.

12. An apparatus for treating and rinsing fruit and the like to remove accumulations from the surfaces thereof comprising a means for advancing a stream of fruit through a predetermined pathway passing through a treating and a rinsing zone, a body of treating liquid below said pathway and transverse thereof and a body of rinsing liquid below said pathway and transversely thereof, rotary means below and transversely of said pathway contacting with said treating liquid and throwing the same upward thorugh said pathway and over onto said fruit, and other like means contacting with said rinsing liquid for throwing the same upward through said pathway over and onto said fruit after passing from said treating zone with means for keeping the treating solution and the rinsing solution separate, housings partially enclosing both of said rotary means to partially segregate the liquids contacting therewith and prevent a surging of the solution in the body of liquids, with deflecting means immediately above said rotary means for directing the projected liquids outward onto the fruit and through the path thereof.

13. An apparatus for treating fruit or the like to remove spray residue and other accumulations therefrom comprising a tank holding a main body of solution, a series of transverse treating rolls for supporting and treating a series of rows of fruit, a progressor member positioned over the rows of fruit for advancing them across said rolls through a predetermined path, a device for projecting liquid up through the path of traveling fruit to fall thereon by gravity, a housing surrounding said projecting means for segregating a body of liquid from said main body in said tank, one wall of said housing being movable to control the flow of liquid from said main body to the segregated body with said housing, the said flow control preventing a surging of the liquid due to the action of said projector device.

14. An apparatus for treating fruit or the like to remove spray residue and other accumulations therefrom comprising a tank holding a main body of solution, a series of transverse treating rolls for supporting and treating rows of fruit, means for segregating rows of fruit from a promiscuously arranged mass of fruit and release them intermittently to said treating rolls, a progressor member positioned over said treating rolls to move said rows of fruit thereacross through a predetermined path, a rotating projector device positioned underneath the path of the rows of fruit for projecting liquid up through said path to fall on said fruit by gravity, a housing in which said projector device rotates for segregating a body of liquid from said main body, an opening in said housing below the surface of the liquid giving flow connection between the main body and the segregated body of liquid to prevent a surging in the main body of liquid due to the rotary action of the projector device.

15. An apparatus for treating or washing fruit or the like comprising a tank holding a main body of liquid, transverse treating rolls for supporting and treating rows of fruit, means for segregating rows of fruit from a promiscuously arranged mass of fruit and releasing them intermittently to pass to said treating rolls, a progressor member arranged over said treating rolls and contacting with said rows of fruit thereon to move them intermittently thereacross through a predetermined path, a projector member positioned transversely underneath the path of movement of said rows of fruit, means for actuating said projector member to project liquid upward through said path to then fall on said fruit by gravity, a partially closed housing surrounding said projector member to segregate a body of liquid from said main body, the opening in said housing being below the surface of the liquid.

16. An apparatus for treating or washing fruit or the like comprising a tank holding a main body of liquid, transverse treating rolls positioned over said body of liquid for supporting and treating rows of fruit, means for moving the rows of fruit intermittently across said treating rolls through a predetermined path, and means for feeding rows of fruit intermittently to said rolls in timed relation with the movement of the rows of fruit on said rolls, a projector device positioned on a level below said treating rolls to project liquid from said tank up through the path of the moving fruit to fall thereon, a partially closed housing surrounding said projector device for segregating a body of liquid from said main body, one wall of said housing being movable so that the flow from the main body to the segregated body may be varied to suit operating conditions.

17. An apparatus for treating fruit and the like comprising a bed of transversely arranged rolls for supporting a body of fruit in valleys between the rolls, means for advancing the fruit along a predetermined path over said rolls, a source of supply of treating solution under the path of travel of said fruit, rotary paddle means transverse of said path and dipping in said solution and throwing a stream of solution upward through said path and over onto the fruit on said bed of rolls to envelope and cover said fruit while passing down through the interstices therebetween to loosen and wash away accumulations from the surfaces of said fruit, means for imparting rotation to said paddle means, and means partially surrounding said paddle means to prevent surging of the solution thereabout and partially segregate the solution immediately in contact with said paddle means.

18. An apparatus for treating and washing fruit and the like comprising a tank holding a main body of treating liquid, transverse treating rolls positioned to form valleys therebetween to support and treat fruit in said valleys, means for feeding fruit to said rolls and means for causing a movement of fruit across said rolls, a projector device positioned on a level below said treating rolls to project liquid from said tank up through said moving fruit to fall thereon, a partially closed housing surrounding said projector device for partially segregating a small body of liquid from the main body to prevent an excessive surging of liquid in the main body, a deflector device above said projector to direct the projected liquid over onto the moving fruit and another deflector plate at the end of the bed of treating rolls to deflect the projected liquid back to the main tank.

19. An apparatus for treating fruit and the like for removing spray residue and other accumulations from the surfaces thereof comprising a series of transverse rolls forming valleys therebetween for supporting and advancing a stream of fruit transversely thereof, grid openings in advance of said supporting rolls over which the fruit passes, rotary means below the said grid openings and transverse thereof for throwing a stream of treating liquid upward through said grid openings and over onto said fruit positioned on said rolls, a tank of solution in which said rotary means is mounted and means for imparting rotation thereto, a housing surrounding said rotating means to segregate the body of liquid directly in contact with said rotating means from the main body of liquid in the tank.

PAUL VAN WYK.